(No Model.)
H. P. TINNIN.
MANURE DISTRIBUTER.
No. 250,606. Patented Dec. 6, 1881.
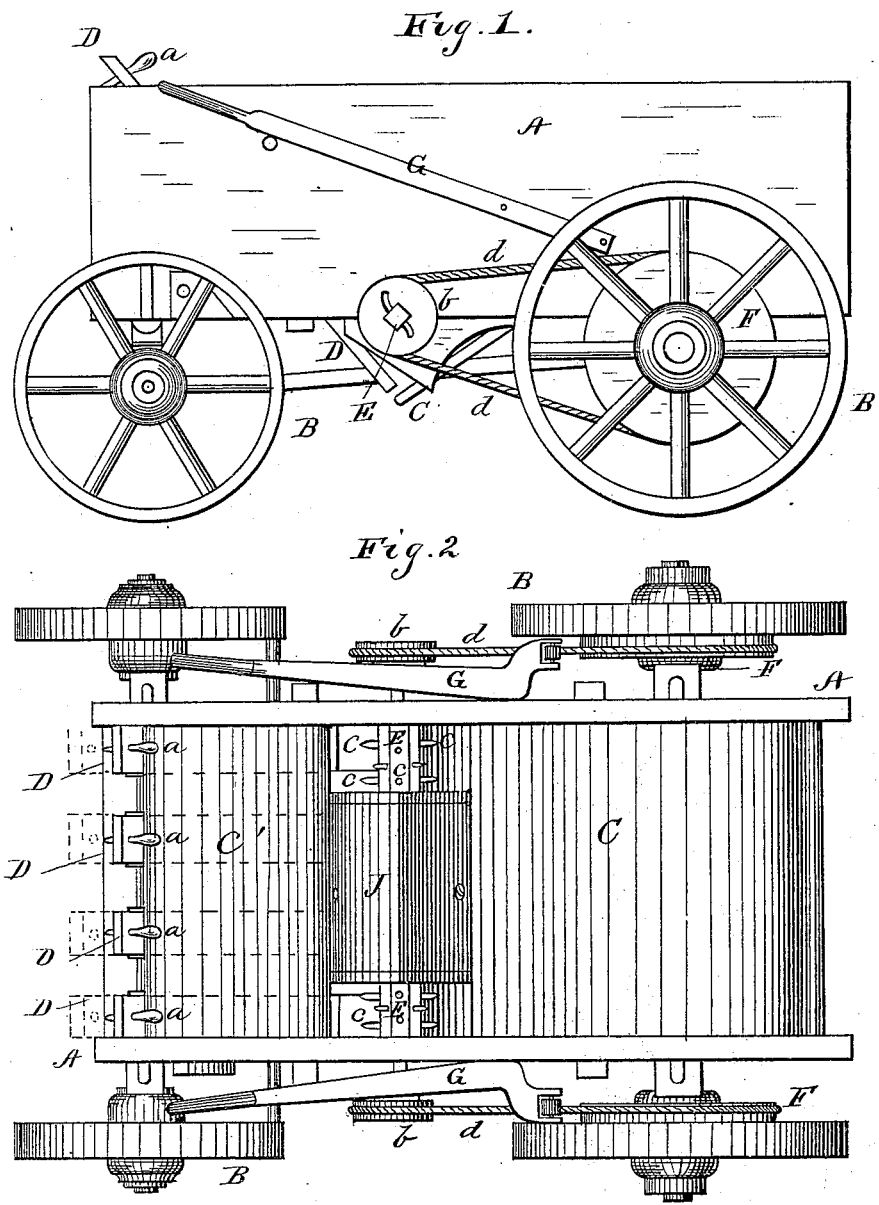
Witnesses.
Edwin L. Yewell,
J. J. McCarthy.
Inventor,
H. P. Tinnin,
per C. M. Alexander
Attorney.

UNITED STATES PATENT OFFICE.

HUGH P. TINNIN, OF BRANDON, MISSISSIPPI.

MANURE-DISTRIBUTER.

SPECIFICATION forming part of Letters Patent No. 250,606, dated December 6, 1881.

Application filed September 8, 1881. (No model.)

*To all whom it may concern:*

Be it known that I, HUGH P. TINNIN, of Brandon, in the county of Rankin, and in the State of Mississippi, have invented certain new and useful Improvements in Manure-Distributers; and I do hereby declare that the following is a full, clear, and exact description thereof, reference being had to the accompanying drawings, and to the letters of reference marked thereon, making a part of this specification.

This invention relates to machines which are designed for distributing manure broadcast or in drills; and the nature of my invention consists, mainly, in a wagon having a double-inclined floor or hopper bottom, in which a number of adjustable distributing-slides are applied for regulating the distribution of the manure or other fertilizer, in combination with a rotating shaft armed with pins, and with a removable double-inclined coverer for the said rotating shaft, as will be hereinafter fully explained.

The following description of my invention will enable others skilled in the art to understand it, the annexed drawings representing, Figure 1, a side elevation; Fig. 2, a top view.

The letter A designates the wagon-body, which may be made of any desired size, and which is mounted on the running-gear B of a common farm or road wagon. The bottom of the wagon-body A is formed of two inclined planes, C C', inclining toward each other, like a hopper. A space is left between the lower end of the rear inclined plane, C, and the corresponding end of the front inclined plane, through which space the manure is allowed to escape and fall to the ground.

D D designate a number of slides, which are applied at suitable distances apart beneath the inclined plane C', and which are movable between suitable guides. There are intermediate strips immovably secured between the slides, which strips extend down to the bottom edge of the rear inclined plane, C. By raising the slides and fixing them by means of pins *a* the outlets for the manure can be enlarged, as circumstances require; or, if desired, by depressing the slides D all or any number of said outlets can be closed.

E designates a horizontal transverse shaft, which has its bearings in the sides of the wagon-body, and which bears grooved band-wheels *b b* on its extremities outside of the wagon-body. Said shaft is located immediately over the outlets for the manure, and it is armed with pins, spikes, knives, or other projections, *c*, suitably arranged to stir, break up, and feed the manure through the outlets. The shaft E is rotated by means of bands *d d*, which pass over the wheels or pulleys *b b*, and also over large grooved driving-wheels F F, fixed to the insides of the two rear wagon-wheels, as shown in the annexed drawings.

If desired, belt-tighteners G G may be used to prevent the belts or bands *d d* from slipping on their wheels.

If it is desired to distribute the fertilizer in drills or rows, a double-inclined coverer, J, of the required length, is applied over the shaft E, and secured by screws or other fastenings to the hopper-bottom of the body A, as shown in Fig. 2. This coverer is of a length equal to the distance between the drills, so that the fertilizer is distributed only from the outlets beyond the ends of the coverer, regulated by the slides D, which are applied to the exposed or uncovered outlets.

The wagon-body and the distributing appliances can be removed from the wagon-bed, and this used for other purposes.

Having described my invention, I claim—

The combination of the two inclined bottoms C C', the discharge-openings therefrom, the independently-adjustable feed-regulating slides D, the spiked roller or shaft E, and the double-inclined coverer J for said roller or shaft, removable from the bottoms, substantially as described.

In testimony whereof I affix my signature, in presence of two witnesses, this 25th day of August, 1881.

HUGH PERRY TINNIN.

Witnesses:
J. L. M. CASKILL,
W. BUCHANAN.